United States Patent
Bokisa et al.

(10) Patent No.: US 12,410,525 B2
(45) Date of Patent: Sep. 9, 2025

(54) MULTILAYER CORROSION SYSTEM

(71) Applicant: MacDermid, Incorporated, Waterbury, CT (US)

(72) Inventors: George Bokisa, North Olmsted, OH (US); Adam Colburn, Liverpool, NY (US); Bradley Durkin, Altoona, IA (US); Maurice Mills, Utica, NY (US); Ambrose Schaffer, Brooklyn Heights, OH (US)

(73) Assignee: MacDermid, Incorporated, Waterbury, CT (US)

( * ) Notice: Subject to any disclaimer, the term of this patent is extended or adjusted under 35 U.S.C. 154(b) by 0 days.

(21) Appl. No.: 18/257,047

(22) PCT Filed: Dec. 17, 2021

(86) PCT No.: PCT/US2021/063945
§ 371 (c)(1),
(2) Date: Jun. 12, 2023

(87) PCT Pub. No.: WO2022/133163
PCT Pub. Date: Jun. 23, 2022

(65) Prior Publication Data
US 2023/0349049 A1  Nov. 2, 2023

Related U.S. Application Data (60) Provisional application No. 63/126,892, filed on Dec. 17, 2020.

(51) Int. Cl.
*C23C 28/02* (2006.01)
*C23C 18/16* (2006.01)
(Continued)

(52) U.S. Cl.
CPC ........ *C23C 28/021* (2013.01); *C23C 18/1648* (2013.01); *C23C 18/1651* (2013.01);
(Continued)

(58) Field of Classification Search
CPC .............. C23C 28/021; C23C 28/1648; C23C 28/1651; C23C 28/1653; C23C 28/32
(Continued)

(56) References Cited

U.S. PATENT DOCUMENTS

| 4,042,752 A | 8/1977 | Hage et al. |
| 4,273,837 A | 6/1981 | Coll-Palagos |

(Continued)

FOREIGN PATENT DOCUMENTS

| CA | 2822476 C | 12/2016 |
| JP | 2001192889 A | * 7/2001 |

OTHER PUBLICATIONS

Matsuyoshi et al., JP2001192889 A Google Patents Machine Translation printed on Dec. 13, 2024, Jul. 17, 2001, entire translation (Year: 2001).*

*Primary Examiner* — Katherine A Christy
(74) *Attorney, Agent, or Firm* — Carmody Torrance Sandak & Hennessey LLP (57) ABSTRACT

An article including a substrate having on at least a portion of its surface a multilayer coating. The multilayer coating including at least one layer of electroless nickel overlying the portion of the surface, at least one layer of electrolytic nickel overlying the layer of electroless nickel, and at least one layer of an electrolytic tin-nickel overlying the layer of electrolytic nickel.

11 Claims, 6 Drawing Sheets

(51) Int. Cl.
    *C23C 18/18*     (2006.01)
    *C23C 18/32*     (2006.01)
    *C25D 3/12*     (2006.01)
    *C25D 3/56*     (2006.01)

(52) U.S. Cl.
    CPC ...... *C23C 18/1653* (2013.01); *C23C 18/1827* (2013.01); *C23C 18/32* (2013.01); *C25D 3/12* (2013.01); *C25D 3/56* (2013.01)

(58) Field of Classification Search
    USPC .......................................................... 428/650
    See application file for complete search history.

(56) References Cited

U.S. PATENT DOCUMENTS

| | | |
|---|---|---|
| 4,346,128 A | 8/1982 | Loch |
| 4,560,623 A | 12/1985 | Iwata et al. |
| 4,929,499 A | 5/1990 | Shadzi et al. |
| 6,527,841 B2 | 3/2003 | Matzdorf et al. |
| 6,811,819 B2 | 11/2004 | Joshi et al. |
| 8,177,956 B2 | 5/2012 | Micyus et al. |
| 10,000,859 B2 | 6/2018 | Browning et al. |
| 10,371,308 B2 | 8/2019 | Verleene et al. |
| 2005/0001316 A1 | 1/2005 | Dean et al. |
| 2008/0318071 A1 | 12/2008 | Holzheimer et al. |
| 2012/0058259 A1 | 3/2012 | Nyf et al. |
| 2019/0230939 A1 | 8/2019 | Jiraschek et al. |
| 2019/0271093 A1* | 9/2019 | Neoh .................. C25D 5/34 |

\* cited by examiner

MULTILAYER CORROSION SYSTEM

RELATED APPLICATION

This application claims priority from U.S. Provisional Application No. 63/126,892, filed Dec. 17, 2020, the subject matter of which is incorporated herein by reference in its entirety.

BACKGROUND

Electroless metal coatings are used in a wide variety of applications in which a protective coating is needed to improve the performance characteristics of the substrate underlying the electroless metal coating. The utility of such coatings lies chiefly in the enhanced physical properties (e.g., hardness) of the electroless metal coating relative to the substrate on which it is disposed. Electroless metal coatings may be used to protect an article which is otherwise susceptible to corrosion from chemicals present in environments in which the article is employed. In addition, because electroless metal coatings are applied to the substrate from solution, the substrate may have a variety of shapes, sizes and perforations and still achieve a coating of uniform composition and thickness. A substantial body of information regarding the preparation and properties of electroless metal coatings is currently available, particularly in the area of coatings comprising nickel-phosphorous or nickel-boron alloys.

SUMMARY

Embodiments described herein relate to an article comprising a multilayer corrosion system and, particularly, relate to a multilayer coating, which includes electroless nickel, electrolytic nickel, and an electrolytic tin-nickel alloy, and its use in a methodology of improving the corrosion resistance of a substrate, such as a zincate coated aluminum substrate.

In some embodiments the article can include a zincate coated aluminum substrate having on at least a portion of its surface a multilayer coating. The multilayer coating can include at least one layer of electroless nickel disposed or deposited on the at least one portion of the zincate coated aluminum substrate, at least one layer of electrolytic nickel overlying the layer of electroless nickel, and at least one layer of electrolytic tin-nickel overlying the layer of electrolytic nickel.

In some embodiment, the multilayer coating can have a thickness of about 0.5 mils to about 2.0 mils and be able to withstand at least 336 hours of neutral salt spray corrosion testing (NSST) without corrosion of the underlying substrate.

In some embodiments, the layer of electroless nickel can have a phosphorous content of about 5% to about 14% by weight. In other embodiments, the layer of electroless nickel can have a mid phosphorous content of about 5% to about 9% by weight. In other embodiments, the layer of electroless nickel coating can have a high phosphorous content of about 10% to about 14% by weight. In still other embodiments, the multilayer coating can include a first layer of electroless nickel with a first phosphorous content, such as a mid phosphorous content, and an overlying second layer of electroless nickel with a second phosphorous content, such as a high phosphorous content, different than the first phosphorous content.

In some embodiments, the layer(s) of electroless nickel can overly the surface of the zincate coated aluminum substrate and be microporous. The thickness of the layer(s) of electroless nickel can be about 0.5 mils to about 2 mils, for example, about 1.0 mil.

In other embodiments, the layer of electrolytic nickel overlying the layer(s) of electroless nickel can be pore free or substantially pore free. The thickness of the layer of electrolytic nickel can be about 0.05 mils to about 0.6 mils, for example, about 0.2 mils. In some embodiments, the thickness of the layer of electrolytic nickel can be substantially less than the thickness of the layer(s) of electroless nickel, for example, at least about 10% less, at least about 20% less, at least about 30% less, at least about 40%, at least about 50%, at least about 60% less, at least about 70% less, at least about 80% less, or at least about 90% less.

In some embodiments, the layer of the electrolytic tin-nickel alloy overlying the layer of electrolytic nickel can include about 50% to about 80% by weight tin, with the balance being substantially nickel. For example, the electrolytic tin-nickel alloy can include about 55% to about 80% by weight tin, about 60% to about 80%, about 65% to about 80% by weight tin, about 70% to about 80% by weight tin, or about 50% to about 80% by weight tin, with the balance being substantially nickel. In still, other embodiments, the electrolytic tin-nickel alloy can include about 65% by weight tin with the balance being substantially nickel. The thickness of the layer of the electrolytic tin-nickel alloy can be about 0.1 mils to about 0.6 mils, for example, about 0.2 mils.

In still other embodiments, the aluminum substrate can be zincated with a zincate immersion coating.

Other embodiments described herein relate to a method of forming a multilayer coating on an aluminum substrate. The method can include coating and/or depositing at least one layer of an electroless nickel on at least a portion of a zincate coated surface of the aluminum substrate. A layer of nickel is then electroplated on the layer or top layer of the electroless nickel. A layer of tin-nickel alloy is subsequently electroplated on the electroplated nickel layer.

In some embodiments, the layer of electroless nickel can have a phosphorous content of about 5% to about 9% by weight. In other embodiments, the layer of electroless nickel coating can have a phosphorous content of about 10% to about 14% by weight. In still other embodiments, the multilayer coating can include a first layer of electroless nickel with a first phosphorous content and an overlying second layer of electroless nickel with a second phosphorous content different than the first phosphorous content.

In some embodiments, the layer(s) of electroless nickel can overly the surface of the zincate coated aluminum substrate and be microporous. The thickness of the layer(s) of electroless nickel can be about 0.5 mils to about 2 mils, for example, about 1.0 mils.

In other embodiments, the layer of nickel electroplated on the layer of electroless nickel can be pore free or substantially pore free. The thickness of the layer of electroplated nickel can be about 0.05 mils to about 0.6 mils, for example, about 0.2 mils. In some embodiments, the thickness of the layer of electroplated nickel can be substantially less than the thickness of the layer(s) of electroless nickel.

In some embodiments, the layer of the tin-nickel alloy electroplated on the layer of electroplated nickel can include about 50% to about 80% by weight tin, with the balance being substantially nickel. For example, the electrolytic tin-nickel alloy can include about 55% to about 80% by weight tin, about 60% to about 80%, about 65% to about 80% by weight tin, about 70% to about 80% by weight tin, or about 50% to about 80% by weight tin, with the balance being substantially nickel. In still, other embodiments, the electrolytic tin-nickel alloy can include about 65% by weight tin with the balance being substantially nickel. The thickness of the layer of the electrolytic tin-nickel alloy can be about 0.1 mils to about 0.6 mils, for example, about 0.2 mils.

In still other embodiments, the method can include zincating the surface of the aluminum substrate prior to applying the multilayer coating.

BRIEF DESCRIPTION OF DRAWINGS

FIGS. 2(A-B) illustrate images of connectors prior to coating.

FIGS. 3(A-B) illustrate images of connectors following coating with the multilayer corrosion system.

FIGS. 4(A-B) illustrate cross-sectional SEM images of deposit layers on sample connectors process through optimized cycles.

FIGS. 5(A-B) illustrate optical images of the six processed connectors following >500 hours of NSS chamber exposure.

FIGS. 6(A-B) illustrate images of opposite sides of crushed/crimped connectors.

DETAILED DESCRIPTION

In the specification and the claims, which follow, reference will be made to a number of terms, which shall be defined to have the following meanings.

The singular forms "a", "an" and "the" include plural referents unless the context clearly dictates otherwise.

As used herein, the verb "comprise" as is used in this description and in the claims and its conjugations are used in its non-limiting sense to mean that items following the word are included, but items not specifically mentioned are not excluded. The present invention may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

"Optional" or "optionally" means that the subsequently described event or circumstance may or may not occur, and that the description includes instances where the event occurs and instances where it does not.

It is also understood that terms such as "top," "bottom," "outward," "inward," and the like are words of convenience and are not to be construed as limiting terms. Furthermore, whenever a particular feature of the invention is said to comprise or consist of at least one of a number of elements of a group and combinations thereof, it is understood that the feature may comprise or consist of any of the elements of the group, either individually or in combination with any of the other elements of that group.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. The term "about" or "approximately" can refer to a quantity, level, value, number, frequency, percentage, dimension, size, amount, weight or length that varies by as much as 15%, 10%, 9%, 8%, 7%, 6%, 5%, 4%, 3%, 2% or 1% to a reference quantity, level, value, number, frequency, percentage, dimension, size, amount, weight or length. In one embodiment, the term "about" or "approximately" refers a range of quantity, level, value, number, frequency, percentage, dimension, size, amount, weight or length ±15%, ±10%, ±9%, ±8%, ±7%, ±6%, ±5%, ±4%, ±3%, ±2%, or ±1% about a reference quantity, level, value, number, frequency, percentage, dimension, size, amount, weight or length.

Embodiments described herein relate to an article comprising a multilayer corrosion system and, particularly, relate to a multilayer coating, which includes electroless nickel, electrolytic nickel, and an electrolytic tin-nickel alloy, and its use in a methodology of improving the corrosion resistance of a substrate, such as a zincate coated aluminum substrate. The article can include a zincate coated aluminum substrate having on at least a portion of its surface a multilayer coating. The multilayer coating can include at least one layer of electroless nickel, at least one layer of electrolytic nickel overlying the layer of electroless nickel, and at least one layer of electrolytic tin-nickel overlying the layer of electrolytic nickel.

Electroless nickel coatings can be applied to substrates, such as zincate coated aluminum substrates, to improve the corrosion resistance and/or enhance the physical properties of the substrate. Typically, such electroless nickel coatings are either the final coating or finish on the substrate or the electroless nickel coated substrate is subjected to a secondary deposition of a tin-nickel alloy to further improve the corrosion resistance of the coating and underlying substrate.

The corrosion resistance of the electroless nickel coating can be measured using neutral salt spray corrosion testing (NSST) where desired and/or minimal corrosion resistance is determined by the ability of the electroless nickel coated aluminum substrate to withstand 336 hours of NSST without any aluminum corrosion. For aluminum connector applications where the desired thickness of the overlying coating is about 0.5 mils to about 2 mils, the ability to withstand 336 hours of NSST without any aluminum corrosion is rarely if ever achieved with just the electroless nickel deposit at the desired thicknesses of 0.5 mils to about 2 mils. Deposits thicker than about 2 mils tend to yield tolerance issues with the connectors. Providing an additional tin-nickel alloy deposit (e.g., nominally 65% Sn/35% Ni) over the electroless nickel deposit was found to enhance the corrosion resistance of the electroless nickel coated aluminum such that the 336 hours of NSST specification can be met, but such corrosion resistance is found to be right on the cusp of viability.

Unexpectedly, it was found that an electrolytic nickel layer can be provided between the layers of the electroless nickel deposit and the tin-nickel alloy deposit to substantially improve the corrosion resistance of the coating without increasing the total thickness of the multilayer coating beyond the thickness of about 2 mils desired for aluminum connectors. Not only was the target 336 hours of NSST achieved, but testing was discontinued after greater than 500 hours without any signs of deposit or substrate corrosion or even staining. While not wishing to be bound by theory, it is postulated that the intervening electrolytic nickel deposit can minimize or eliminate porosity or microporosity in the layer of electroless nickel that could possibly allow for direct corrosion paths from the surface to the aluminum substrate.

Figure 1:
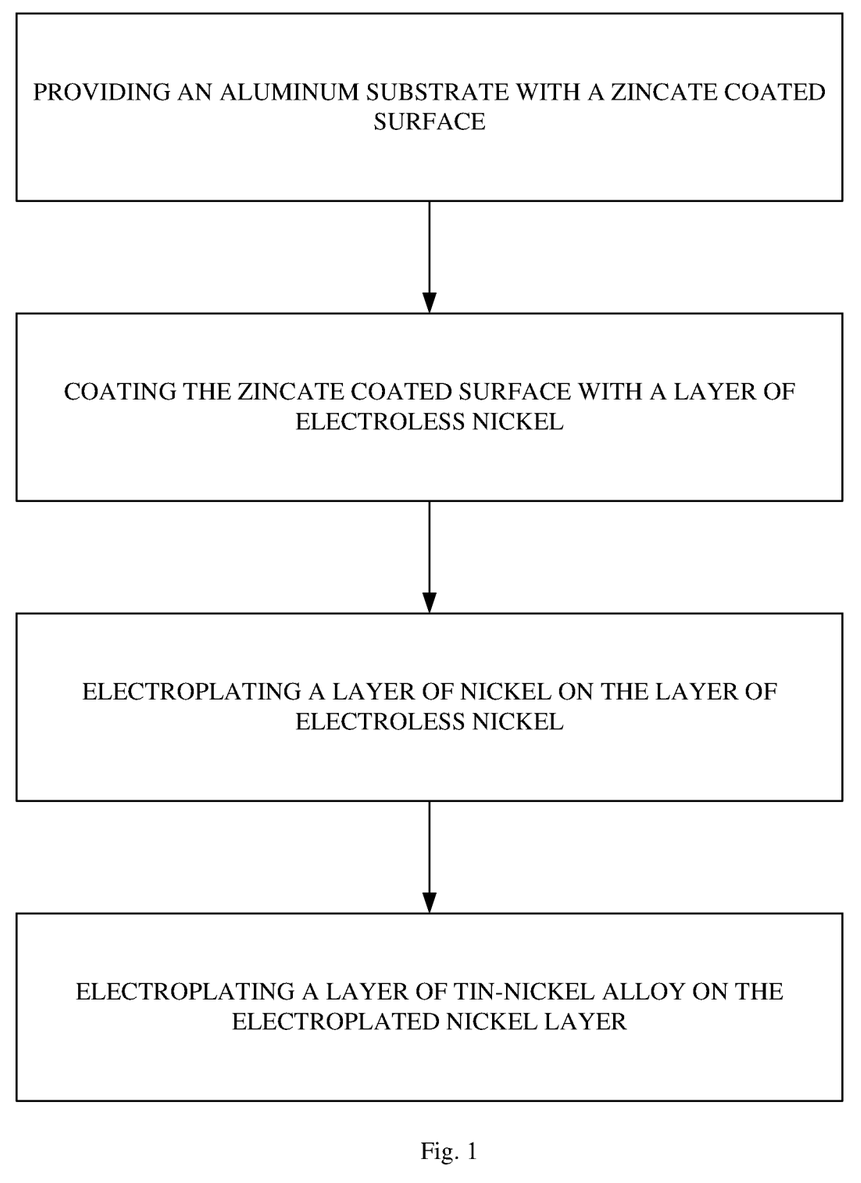
FIG. 1 is a flow diagram illustrating a method of forming a multilayer coating on zincate coated substrate in accordance with an embodiment.

FIG. 1 is a flow diagram illustrating a method of forming a multilayer coating on an aluminum substrate, such as an aluminum connector, in accordance with an embodiment describe herein. The method can include processing an aluminum part or substrate, such as an aluminum connector, through a standard aluminum preplate clean and zincate process, such as a double zincate process. In a typical double zincate on aluminum process, the aluminum substrate is first cleaned to remove dirt, grease and oils and then etched to provide a substrate suitable for adhesion of a zincate coating. The etched substrate is then desmutted with nitric acid to remove surface aluminum oxide, and the aluminum substrate is then zincated by immersion in a zincate solution.

The zincate solution typically includes about 120 g/l to about 500 g/l sodium hydroxide, about 20 g/l to about 100 g/l zinc oxide, about 10 g/l to about 60 g/l of a salt, such as potassium sodium tartrate or other complexing organic acid salts, such as gluconates and salicylates and additives.

The zincate layer formed by immersion of the aluminum substrate in the zincate solution can be a fugitive coating that can disappear in the subsequent metal plating operation. In some embodiments, the first zincate layer can be stripped using nitric acid, and a second zincate layer can be applied to the aluminum substrate, which can be more uniform than the first zinc layer, by immersion in the zincate solution.

In some embodiments, following zincating the surface of the aluminum substrate, the surface of the zincate coated aluminum substrate can be contacted with an alkaline electroless nickel strike to initiate nickel deposition with an electroless nickel solution to provide a deposit or layer of phosphorous electroless nickel having a substantially uniform thickness of about 0.5 mil to about 2 mil, for example, about 1.0 mils.

In some embodiments, the layer of electroless nickel can have a phosphorous content of about 5% to about 14% by weight. In other embodiments, the layer of electroless nickel can have a mid phosphorous content of about 5% to about 9% by weight. In other embodiments, the layer of electroless nickel coating can have a high phosphorous content of about 10% to about 14% by weight. For clarity, high phosphorous electroless nickel includes about 10% to about 14% by weight phosphorous, with the balance being nickel and a mid phosphorous electroless nickel deposit includes about 5% to about 9% by weight phosphorous with the balance being nickel.

In still other embodiments, the electroless nickel deposited on the zincate coated aluminum substrate can include a first layer of electroless nickel with a first phosphorous content, such as a mid phosphorous content, and an overlying second layer of electroless nickel with a second phosphorous content, such as a high phosphorous content, different than the first phosphorous content. The layers of phosphorous electroless nickel can have a substantially uniform total or combined thickness of about 0.5 mil to about 2 mil, for example, about 1.0 mils.

In other embodiments, following zincating the aluminum substrate, the alkaline electroless nickel strike can be omitted, and the zincate coated aluminum substrate can contacted with electroless nickel solution, such as a high phosphorous electroless nickel solution and/or the mid phosphorous electroless nickel solution, to provide deposit(s) or layer(s) of high and/or mid phosphorous electroless nickel having a substantially uniform thickness of about 0.5 mil to about 2 mil, for example, about 1.0 mils.

The layer(s) of electroless nickel can be provided on the zincate coated surface of the aluminum substrate using a hypophosphite reduced nickel bath or solution. It will be appreciated that other electroless nickel baths that use other reducing agents (e.g., borohydrides, dimethylamine borane, hydrazine, formaldehyde) may also be used. In some embodiments, a high phosphorous electroless nickel bath and/or a mid phosphorous electroless nickel bath used to form the layer(s) or deposit(s) of electroless nickel on the zincate coated aluminum substrate can includes Ni, a hypophosphorous reducing agent, and optionally at least one of a complexing agent, chelating agent, stabilizer, and/or pH buffer.

The nickel can be provided in the bath in the form of a water soluble nickel salt. Water-soluble nickel salts can include those, which are soluble in the bath and which can yield an aqueous solution of a predetermined concentration. The nickel salt can include, for example, nickel sulfate, nickel chloride, nickel bromide, nickel iodide, nickel acetate, nickel malate, a nickel hypophosphite and combinations thereof. The water-soluble nickel salts may be used alone or as a mixture.

In some embodiments, the concentration of nickel in the electroless nickel plating bath can be from about 1 g/L to 70 g/L. In other embodiments, the concentration of nickel in the electroless nickel plating bath can be about 4 g/L to about 6 g/L.

The hypophosphorous reducing agent used in the bath can include any of a variety of hypophosphorous reducing agents used in known types of the electroless nickel plating baths. In some embodiments, the hypophosphorous reducing agent can include, for example, sodium hypophosphite, potassium hypophosphite, ammonium hypophosphite, and combinations thereof.

The concentration of the hypophosphorous reducing agent in the electroless nickel plating bath can differ with the respective types of hypophosphorous reducing agent and can be adjusted to vary the concentration of the phosphorous in the layer or deposit of electroless nickel that is formed using the bath. In some embodiments, the concentration of the hypophosphorous reducing agent in the electroless nickel-phosphorous plating bath can be about 25 g/L to about 40 g/L, for example, about 30 g/l to about 35 g/l.

In some embodiments, a complexing agent or a mixture of complexing agents may be included in the electroless nickel-phosphorous plating bath. Complexing agents as used herein can also include chelating agents. The complexing agents and/or chelating agents generally retard the precipitation of nickel ions from the plating bath as insoluble salts, such as phosphites, by forming a more stable nickel complex with the nickel ions and provide for a moderate rate of the reaction of nickel precipitation.

The complexing agents and/or chelating agents can be included in the bath in amounts sufficient to complex the nickel ions present in the solution and to further solubilize the hypophosphite degradation products formed during the deposition process.

A variety of complexing agents, used in known electroless nickel plating baths, may be used. Specific examples of the complexing agents may include monocarboxylic acids, such as glycolic acid, lactic acid, gluconic acid or propionic acid, dicarboxylic acids, such as malic acid, malonic acid, succinic acid, tartaric acid, oxalic acid or adipic acid, aminocarboxylic acids, such as glycine or alanine, ethylene diamine derivatives, such as ethylenediamine tetraacetate, versenol (N-hydroxyethyl ethylenediamine-N,N',N'-triacetic acid) or quadrol (N,N,N',N'-tetrahydroxyethyl ethylene diamine), phosphnic acids, such as 1-hydroxyethane-1,1-diphosphonic acid, ethylene diamine tetramethylene phosphonic acid and water-soluble salts thereof. The complexing agents may be used either alone or in combination.

Some complexing agents, such as acetic acid or succinic, for example, may also act as a pH buffering agent, and the appropriate concentration of such additive components can be optimized for any plating bath after consideration of their dual functionality.

In some embodiments, at least one pH buffer, complexing agent, or chelating agent can be selected from the group consisting of an acetic acid, formic acid, succinic acid, malonic acid, an ammonium salt, lactic acid, malic acid, citric acid, glycine, alanine, glycolic acid, lysine, aspartic acid, ethylene diamine tetraacetic acid (EDTA), and combinations thereof. In some embodiments, mixtures of two or more of the above pH buffers, complexing agents, and/or chelating agents can be used in the electroless nickel plating bath described herein, with each pH buffer, complexing agent, and/or chelating agent being provided at a concentration of about of about 1 to about 75 g/l.

The electroless nickel plating bath may also contain, in addition to the above components, additives with various kinds of purposes so long as the properties of the plating bath are not deteriorated.

The electroless nickel plating baths can be operated or maintained at a pH of about 4.5 to about 5.0 during electroless nickel plating of the zincate coated aluminum substrate. With this range of pH, the reducing reaction by the hypophosphorous reducing agent is allowed to occur efficiently to prevent decomposition of the hypophosphorous reducing agent as well as to prevent the performance of precipitation for plating from being deteriorated and to prevent the plating bath from being decomposed. Moreover, with this range of pH, it is possible to prevent the plating bath from being lowered in stability as a result of the excessively high reducing potential of the reducing agent.

At least one pH adjustment agent can be used to adjust the pH to the above range. When the pH of the bath is too high, it can be adjusted by adding, for example, an acid. When the pH of the bath is too low, it can be adjusted by adding, for example, ammonium hydroxide.

The stability of the operating pH of the plating bath can be controlled by the addition of various buffer compounds such as acetic acid, propionic acid, boric acid, or the like, in amounts up to about 30 g/l with amounts of from about 2 to about 30 g/l being typical. As noted above, some of the buffering compounds such as acetic acid and succinic acid may also function as complexing agents.

It will be appreciated that the substrate plated provided with the multilayer corrosion system and/or provided with the electroless nickel deposit or layer(s) is not limited to zincate coated aluminum substrate and include any substrate can be plated with the electroless nickel plating bath to provide an electroless nickel deposit or coating on the substrate. The substrate can be any substrate capable of supporting the electroless nickel coating but is typically a material for which the electroless nickel coating displays sufficient affinity to form a stable coating thereupon. Substrates may be inorganic materials, such as metals, or organic materials such as plastics, or composite materials, for example, organic polymer comprising inorganic filler. In one embodiment, the substrate is a metal substrate. Non-limiting examples of metal substrates include iron, chromium, nickel, cobalt, copper, aluminum, titanium, and the like. In another embodiment, the substrate comprises steel. In one embodiment, the substrate comprises low alloy steel, for example low alloy carbon steel. In yet another embodiment, the substrate is a zincate coated aluminum substrate.

The substrate can be plated by contacting the substrate with or immersing the substrate in the plating bath for a duration time effective to form an electroless nickel coating or deposit on a desired surface of the substrate. In some embodiment, the substrate can be cleaned or pre-processed prior to plating. During plating, the bath can be maintained at a bath temperature about 175° F. to about 200° F. The duration of contact of the electroless nickel plating bath with the substrate being plated will determine the thickness of the electroless nickel coating. Typically, a contact time can range from as little as about one minute to several hours or even several days.

During the deposition of the electroless nickel deposit or coating, mild agitation can be employed. The mild agitation can be, for example, a mild air agitation, mechanical agitation, bath circulation by pumping, rotation of a barrel for barrel plating, etc. The electroless nickel plating bath also may be subjected to a periodic or continuous filtration treatment to reduce the level of contaminants therein. Replenishment of the constituents of the bath may also be performed, in some embodiments, on a periodic or continuous basis to maintain the concentration of constituents, and in particular, the concentration of nickel ions and hypophosphite ions, as well as the pH level within the desired limits.

After depositing the layer(s) of electroless nickel on the substrate, such as a zincate coated aluminum substrate, the electroless nickel coated aluminum substrate can be optionally rinsed and then electroplated with nickel to provide a layer of electrolytic nickel. The layer or deposit of electrolytic nickel can be referred to as "microstructural nickel". "Microstructural nickel" or a microstructural nickel deposit can be a pore free or substantially pore free nickel deposit or layer that is generated from electroplating the electroless nickel coated substrate in a nickel electroplating solution, such as a sulfamate based nickel electrolyte or nickel electroplating solution.

Alternatively, the layer of electrolytic nickel or microstructural nickel can be generated from a combination of sulfate/chloride electrolyte, commonly referred to as a "Watts bath" or other nickel deposit producing electrolyte that produces an essentially pore free deposit. Typically, such baths contain nickel sulfate, nickel chloride, and boric acid dissolved in water. All chloride and fluoroborate plating solutions can also be used. These baths can optionally include a number of well-known and conventionally used compounds such as leveling agents, brighteners, and the like. The electrolytic nickel deposit or layer can be pore free or substantially pore free and have a substantially uniform thickness that can be substantially less than the thickness of the of about 0.05 to about 0.6 mils, (e.g., about 0.2 to about 0.3 mils).

The electroless nickel and electrolytic nickel plated zincate coated aluminum substrate can then be rinsed and an electrolytic tin-nickel alloy deposit or layer can be provided on the electrolytic nickel layer using conventional tin-nickel alloy electroplating processes. These processes and plating baths are well known and are disclosed, for example, in U.S. Pat. Nos. 4,033,835; 4,049,508; 3,887,444; 3,772,168 and 3,940,319, all of which are incorporated herein by reference. The layer or deposit of electrolytic tin-nickel alloy can include about 50 to about 80 weight percent tin and about 20 to about 50 weight percent nickel. For example, the electrolytic tin-nickel alloy can include about 55% to about 80% by weight tin, about 60% to about 80%, about 65% to about 80% by weight tin, about 70% to about 80% by weight tin, or about 50% to about 80% by weight tin, with the balance being substantially nickel. In still, other embodiments, the electrolytic tin-nickel alloy can include about 65% by weight tin with the balance being substantially nickel representing the atomic composition SnNi. The layer of electrolytic tin-nickel alloy or tin-nickel electroplate can have a substantially uniform thickness of about 0.1 to about 0.6 mils (e.g., about 0.2 mil target) on top of or overlying the layer of intervening microstructural or electrolytic nickel.

Advantageously, the processed part or substrate, such as an aluminum part or substrate, will have a substantially improved corrosion resistance as compared to just an electroless nickel plated part or substrate as well as an electroless nickel plated part or substrate with just a tin-nickel alloy electroplated top layer and without the intervening electrolytic nickel layer. In some embodiments, the method and multilayer coating can increase the corrosion resistance of an aluminum substrate such that the aluminum substrate coated with the multilayer coating can withstand at least 336 hours of NSST, at least 360 hours of NSST, at least 384 hours of NSST, at least 408 hours of NSST, at 432 hours of NSST, at least 456 hours of NSST, at least 480 hours of NSST, at least 500 hours of NSST or more.

It is unexpected that inclusion of a thin microstructural nickel layer between two alloys that already contain significant amounts of nickel themselves would have such pronounced or substantial (at least about 50%, at least about 60%, at least about 70%, at least about 80% or more) improvement over the two layers (electroless nickel and electrolytic tin-nickel) without the layer.

The following example illustrates a process methodology of the invention. Unless otherwise indicated in the following examples, in the written description and in the claims, all parts and percentages are by weight, temperatures are in degrees Fahrenheit and pressure is at or near atmospheric pressure.

EXAMPLE

Figure 2A:
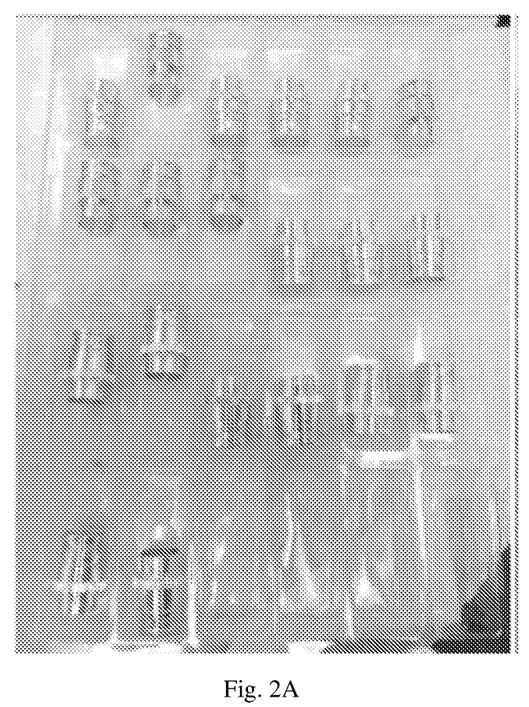
Figure 2B:
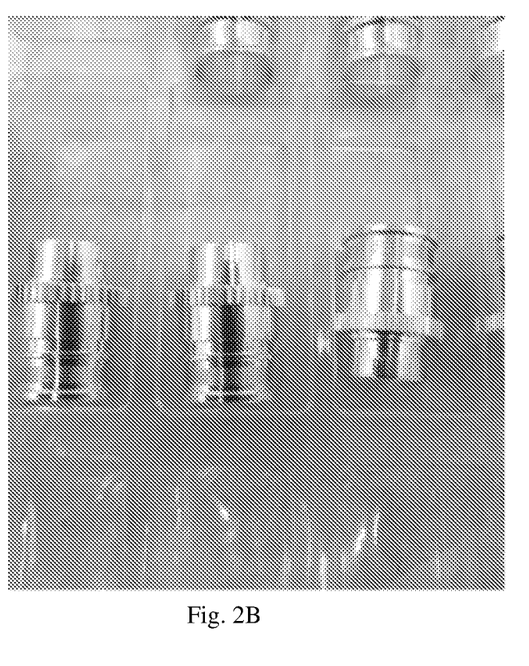

A sample set of about 100 small 6061 aluminum connectors was provided for process development (FIGS. 2A-2B). The goal was to develop a cycle and deposit matrix where the connectors would be processed with an electroless nickel deposit, an electrolytic nickel deposit, and the final layer being an electrolytic tin-nickel deposit. These connectors would need to demonstrate that they could withstand at least 336 hours of NSS chamber exposure without aluminum corrosion being observed on the test specimens.

To validate & characterize the performance of the final process matrix on the connectors, cross-sectional investigations were performed on a representative part to highlight the relative deposit thicknesses (and to ensure that the approximate target thicknesses were met). NSS corrosion testing was also performed on a sample set of 6 plated connectors, and an 8$^{th}$ connector was "crimped", or crushed, to verify adequate adhesion of the deposit layers.

The processing matrix that yielded the most promising results included an optimized pretreatment cycle (outlined herein), the application of an alkaline nickel strike, an electroless nickel deposit (about 1.0 mils), Sulfamate electrolytic Ni strike (about 0.2 mils), finished with the electrolytic Sn/Ni deposit.

Process Methodology

1. A 20 gal electroless nickel bath was blended for processing (aged to about 0.5 metal turnovers (MTO) before plating).
2. Following the process cycle listed below, the parts were then processed in an electroless nickel bath.
3. The bath was analyzed via Ni titrations and maintained at about 90-100% activity for Ni and Sodium Hypophosphite. The pH was maintained at about 4.8 (+/−0.1).
4. Sulfamate Ni made up with about 3 g/L NiCl$_2$; about 37.5 g/L Boric Acid; about 180 g/L Ni Sulfamate; pH at about 3.9; operated at about 120° F. for about 30 min at about 10 ASF.
5. The electrolytic tin-nickel bath made up per specification requirements; pH at about 4.5 to about 5.0; operated at about 155° F. for about 12 min at about 15 ASF Process Cycles 1. Non-etch soak clean for 5 minutes in PRESOL 5161/5 opg./150° F.
2. Rinse
3. Deoxidize with deoxidation solution for 5 minutes/30% b.v./room temperature
4. Rinse
5. Alkaline Etch for 90 seconds with 38 g/L of etch solution (about 5 ounces/gal)/at 160° F.
6. Rinse
7. Deoxidize with deoxidation solution for 5 minutes/30% b.v./room temperature
8. Rinse
9. Additional deoxidation in 50% v/v HNO$_3$ Acid at Room Temperature (e.g., about 75° F.)
10. Rinse
11. Immerse for 45 seconds in zincate solution/25% b.v. at about 75° F.
12. Rinse
13. Strip zincate in 50% v/v Nitric Acid for 45 seconds
14. Rinse
15. Immerse for 20 seconds in zincate solution.
16. Rinse
17. Alkaline Strike in electroless nickel process per specification for about 5 to about 10 mins/90° F.
18. Dip Rinse
19. Electroless nickel plate in electroless nickel bath at 190° F. (about 1.0 mils thickness)
20. Rinse
21. Sulfamate Ni electroplate—(120° F. for 30 min at 10 ASF); 0.2 mils thickness
22. Rinse
23. Tin-nickel alloy electroplate in electrolytic tin-nickel bath (155° F. for 12 mins about 15 ASF); 0.2 mils thickness
24. Rinse
25. Air Dry Neutral Salt Spray Corrosion Chamber Exposure Salt fog corrosion testing was performed on the above sample(s). Parts were inspected at 24-hour intervals for signs of corrosion failure for a total of >500 hours of exposure. Corrosion failure is defined as visual signs of red rust, which would indicate base metal corrosion ("white" rust observed on Zn-plated parts, or where Al is the substrate as opposed to steel). Salt spray corrosion testing was conducted in accordance with ASTM B117 standards. Optical images of connectors prior to testing, as well as at conclusion of testing, are included.

TABLE 1

| Samples | Hrs to Corrosion | Comments |
| --- | --- | --- |
| Six Processed 6061 Al Connectors: | NA | No corrosion observed on any of the test specimens following > hrs. of chamber exposure |

Conclusions

Figure 3A:
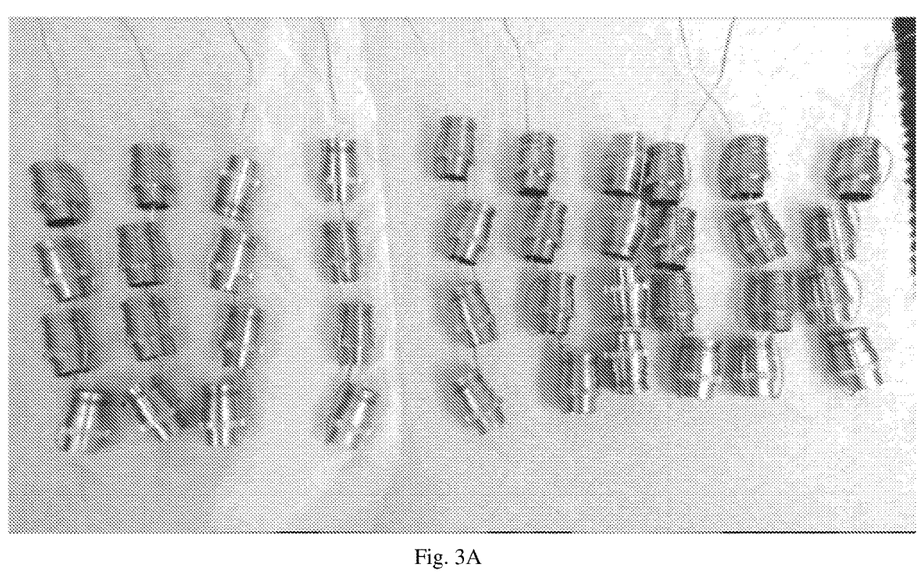
Figure 3B:
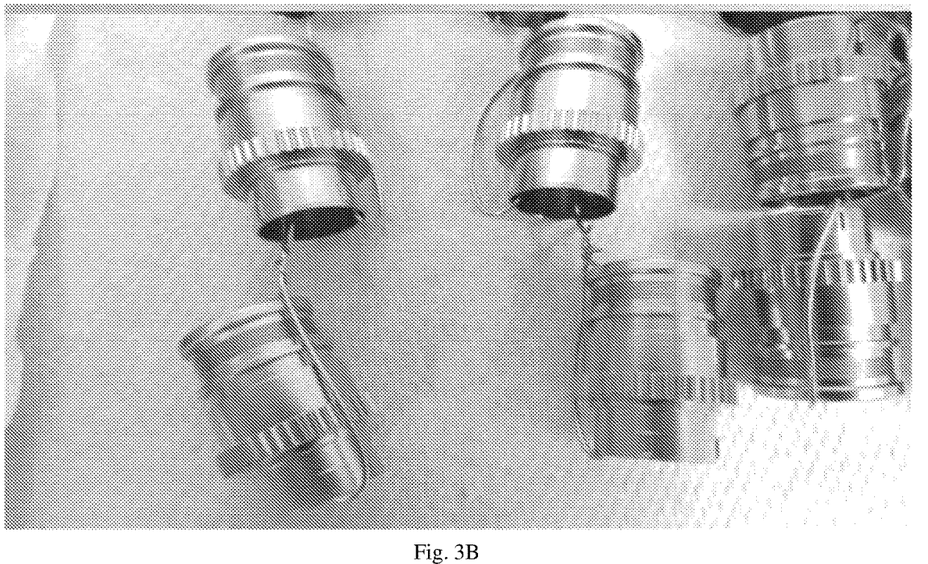

Following the analysis of various iterations and versions of the cycle outlined above, a number of test pieces were processed through the final, optimized cycle (40 total samples) (FIGS. 3A-3B). This cycle yielded connectors that exhibited adequate adhesion, uniform appearance, >500 hours of NSS corrosion chamber exposure without failure, and cross-sectional thickness verification measurements indicated that the process as outlined yielded the approximate target thicknesses of each individual layer.

TABLE 2

Average Cross-Sectional Thickness Measurements

| Sample Areas | ENOVA H-15 HPEN (mils) | Sulfamate Ni (mils): | ENOVALOY 5028 (mils): |
| --- | --- | --- | --- |
| Connector OD: | 0.92 | 0.25 | 0.25 |
| Connector ID: | 1.07 | 0.11 | 0.13 |

Figure 4A:
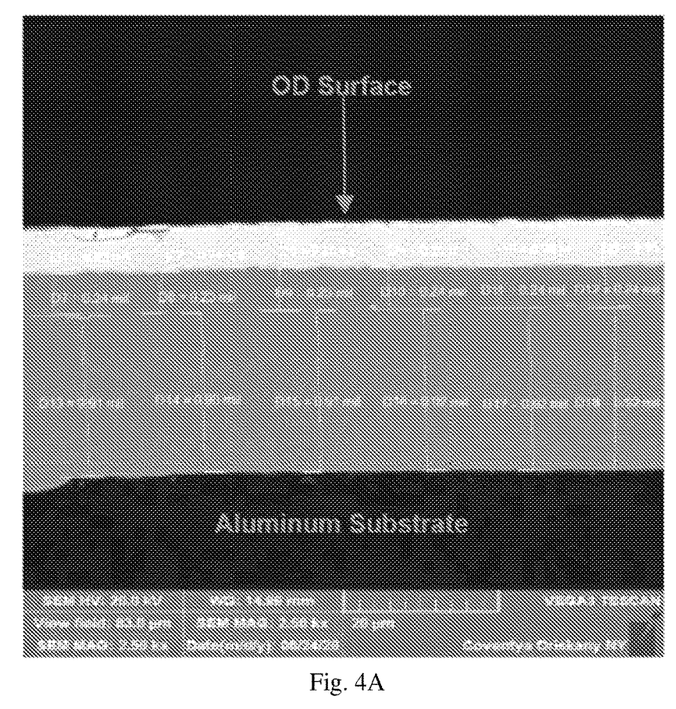
Figure 4B:
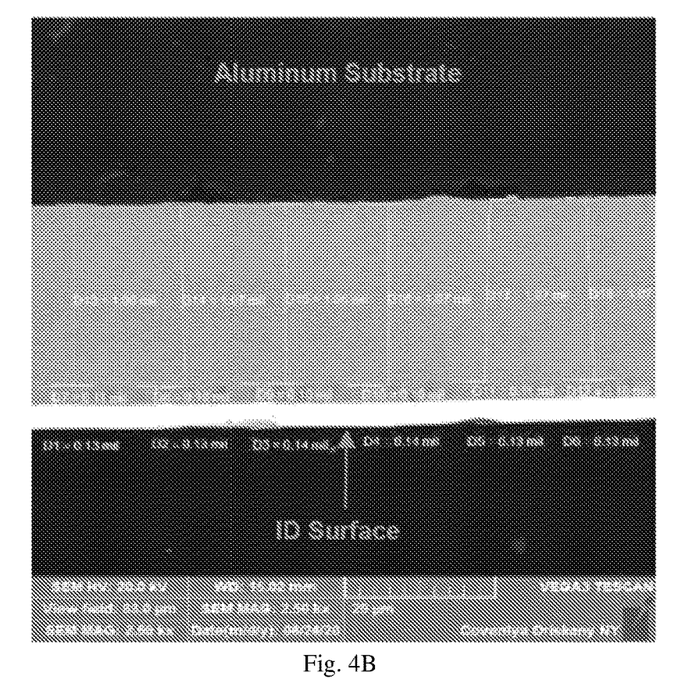

One representative connector processed through the optimized cycle outlined in this report was cross-sectioned, where the OD & ID surfaces were inspected, and deposit layer thickness measurements were collected & averaged in the table above (FIGS. 4A and 4B).

Neutral Salt Spray Corrosion Chamber Testing

Figure 5A:
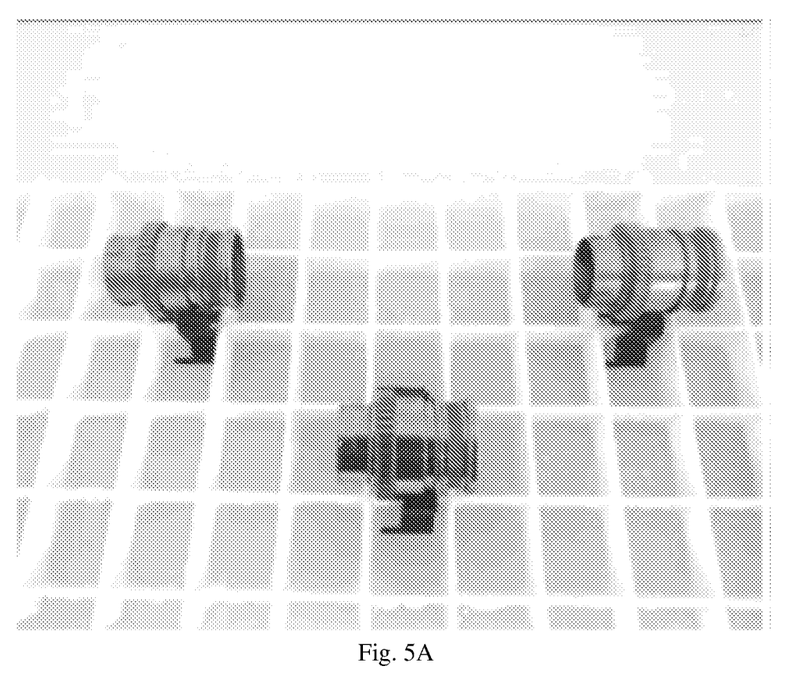
Figure 5B:
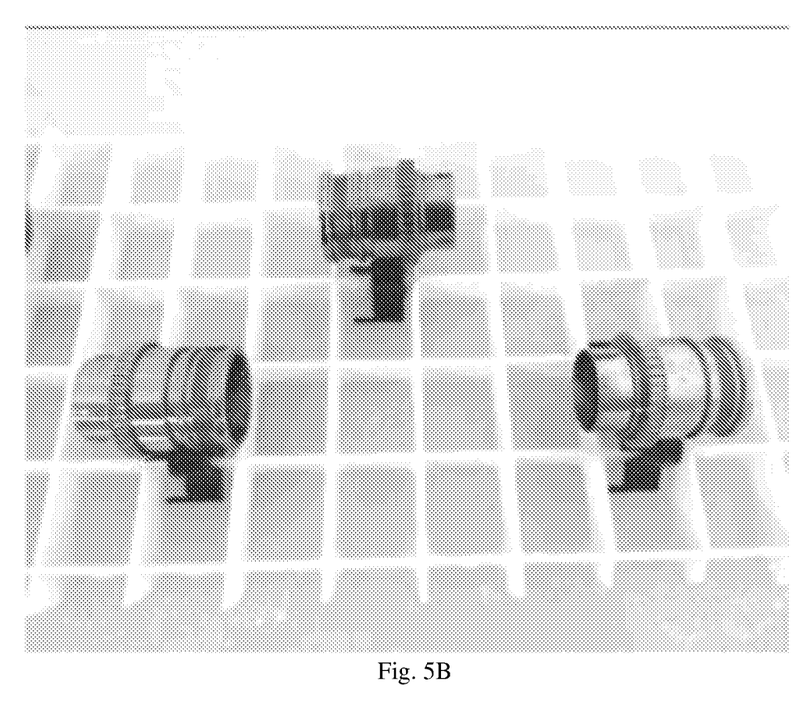

Following >500 hours of chamber exposure, six representative connectors processed through the optimized cycle as outlined in the report exhibited no signs of staining or corrosion to the Al substrate (FIGS. 5A-5B).

Qualitative Deposit Adhesion Assessment

Figure 6A:
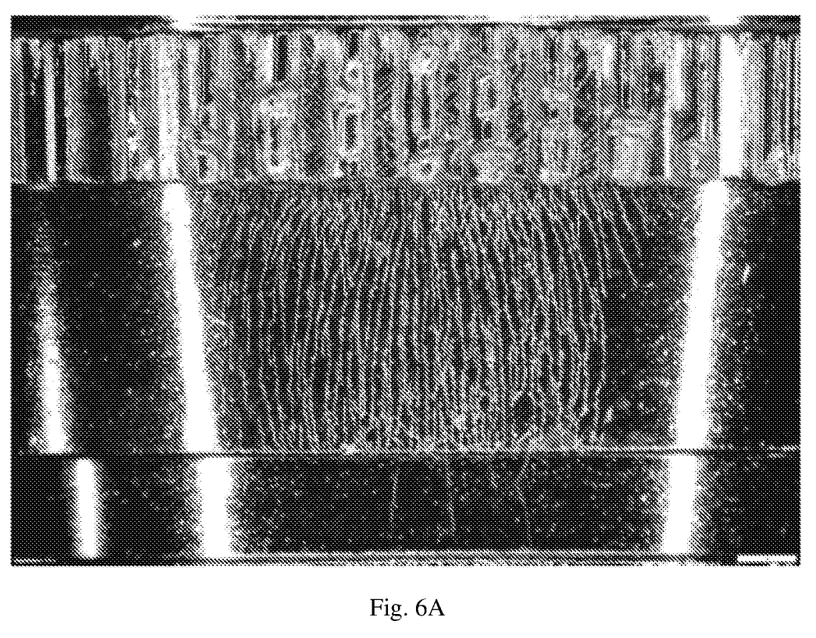
Figure 6B:
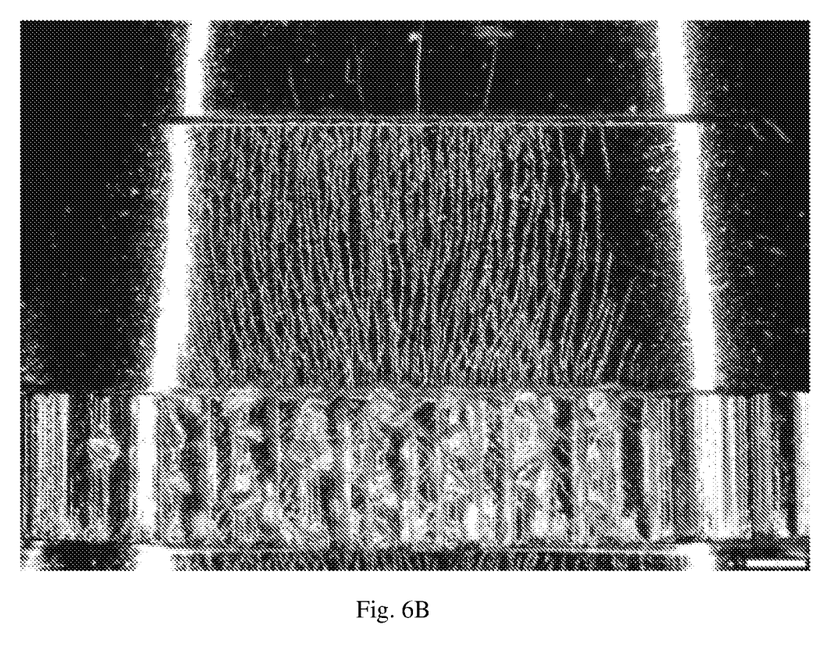

Following crimp/crush of representative connector processed through the optimized cycle, upon optical inspection, no flaking or inadequate adhesion were found or documented (FIGS. 6A-6B).

From the above description of the invention, those skilled in the art will perceive improvements, changes and modifications. Such improvements, changes, and modifications are within the skill of the art and are intended to be covered by the appended claims. All patent publications and references cited in the present application are herein incorporated by reference in their entirety.

Having described the invention, the following is claimed:

1. An article comprising:
    a metal substrate, which is optionally zincate coated, having on at least a portion of its surface a multilayer coating, the multilayer coating comprising at least one layer of electroless nickel overlying the portion of the surface, at least one layer of electrolytic nickel overlying the layer of electroless nickel, and at least one layer of electrolytic tin-nickel overlying the layer of electrolytic nickel;
    wherein the at least one layer of electroless nickel has a thickness of about 0.5 mil to about 2 mil; and
    wherein the thickness of the at least one layer of electrolytic nickel is at least 10% less than the thickness of the at least one layer of electroless nickel.

2. The article of claim 1, wherein the at least one layer of electroless nickel has a phosphorous content of about 5% to about 14% by weight.

3. The article of claim 1, wherein the at least one layer of electroless nickel comprises two electroless nickel layers having different phosphorous contents.

4. The article of claim 1, wherein the at least one layer of electroless nickel is microporous and the layer of electrolytic nickel is pore free or substantially pore free.

5. The article of claim 1, wherein the layer of electrolytic tin-nickel alloy includes about 50% to about 80% by weight tin, with the balance being substantially nickel.

6. The article of claim 1, wherein the layer of electrolytic nickel has a thickness of about 0.05 mils to about 0.6 mils.

7. The article of claim 1, wherein the layer of electrolytic tin-nickel alloy has a thickness of about 0.1 mils to about 0.6 mils.

8. The article of claim 1, wherein the metal substrate is zincated with a zincate immersion coating.

9. The article of claim 1, wherein the multilayer coating has a thickness of about 0.5 mils to about 2.0 mils and is able to withstand at least 336 hours of neutral salt spray corrosion testing (NSST) without corrosion of the underlying substrate.

10. The article of claim 1, wherein the metal substrate comprises an aluminum substrate.

11. The article of claim 3, wherein a first electroless nickel layer has a phosphorous content of about 5% to about 9% by weight, and a second electroless nickel layer has a phosphorous content of about 10% to about 14% by weight.

* * * * *